United States Patent
Kobayashi et al.

(10) Patent No.: US 8,608,842 B2
(45) Date of Patent: Dec. 17, 2013

(54) INFRARED ABSORBING COMPOSITION, INFRARED ABSORBING INK, RECORDED ARTICLE, IMAGE RECORDING METHOD, AND IMAGE DETECTING METHOD

(75) Inventors: Katsumi Kobayashi, Kanagawa (JP); Keizo Kimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 327 days.

(21) Appl. No.: 13/106,546

(22) Filed: May 12, 2011

(65) Prior Publication Data

US 2011/0281086 A1    Nov. 17, 2011

(30) Foreign Application Priority Data

May 17, 2010 (JP) ................................. 2010-113286

(51) Int. Cl.
  *C09D 11/00* (2006.01)
  *C09B 47/04* (2006.01)
  *G02B 5/22* (2006.01)

(52) U.S. Cl.
  USPC ............... 106/31.49; 106/31.78; 540/139; 540/140; 252/587

(58) Field of Classification Search
  USPC ............... 106/31.49, 31.47, 31.77, 31.78; 540/122, 125, 139, 140; 428/195.1; 250/340; 252/587
  See application file for complete search history.

(56) References Cited

U.S. PATENT DOCUMENTS

| | | | |
|---|---|---|---|
| 4,606,859 A * | 8/1986 | Duggan et al. | 540/122 |
| 4,798,781 A * | 1/1989 | Hirose et al. | 430/270.17 |
| 4,960,538 A * | 10/1990 | Itoh et al. | 252/587 |
| 5,024,926 A * | 6/1991 | Itoh et al. | 540/140 |
| 5,168,031 A * | 12/1992 | Buckingham et al. | 430/270.16 |
| 5,282,894 A | 2/1994 | Albert et al. | |
| 5,614,008 A * | 3/1997 | Escano et al. | 106/31.49 |
| 5,695,911 A * | 12/1997 | Itoh et al. | 430/270.16 |
| 5,788,914 A * | 8/1998 | Oi et al. | 252/587 |
| 5,804,102 A * | 9/1998 | Oi et al. | 252/587 |
| 6,468,713 B1 | 10/2002 | Terao et al. | |
| 7,838,670 B2 * | 11/2010 | Kimura et al. | 540/140 |
| 8,057,589 B2 * | 11/2011 | Banning | 106/31.49 |
| 2004/0184173 A1 * | 9/2004 | Kobayashi et al. | 252/587 |
| 2004/0253419 A1 * | 12/2004 | Bleikolm et al. | 428/195.1 |
| 2006/0000388 A1 * | 1/2006 | Campbell et al. | 106/31.49 |
| 2007/0073054 A1 * | 3/2007 | Kimura et al. | 540/139 |
| 2009/0117266 A1 * | 5/2009 | Kimura et al. | 427/160 |
| 2009/0202930 A1 * | 8/2009 | Furukawa et al. | 430/105 |
| 2010/0286407 A1 * | 11/2010 | Kimura et al. | 548/402 |
| 2011/0135815 A1 * | 6/2011 | Ganapathiappan et al. | 427/160 |
| 2011/0278461 A1 * | 11/2011 | Kobayashi et al. | 250/340 |

FOREIGN PATENT DOCUMENTS

| | | |
|---|---|---|
| EP | 1 308 485 A1 | 5/2003 |
| GB | 2 237 284 A | 5/1991 |
| JP | 2-43269 A | 2/1990 |
| JP | 2-138382 A | 5/1990 |
| JP | 3-79683 A | 4/1991 |
| JP | 2007-056105 A | 3/2007 |
| JP | 2009-051774 A | 3/2009 |
| WO | WO 2004/020529 A1 | 3/2004 |
| WO | WO 2007/002981 A1 | 1/2007 |
| WO | WO 2010/100964 A1 | 9/2010 |

OTHER PUBLICATIONS

English translation of JP 2010/229389; Oct. 2010.*
English translation of JP 2007/056105; Mar. 2007.*
English translation of JP 2009/051774; Mar. 2009.*
Communication, dated Aug. 23, 2011, issued in corresponding EP Application No. 11165447.1, 6 pages.

* cited by examiner

*Primary Examiner* — Helene Klemanski
(74) *Attorney, Agent, or Firm* — Sughrue Mion, PLLC

(57) ABSTRACT

An infrared absorbing composition including a compound that is represented by formula (1) and has solubility of 30 mg/mL or less in toluene at 25° C., an organic solvent having a solubility parameter of from 7.3 to 12.1, and a resin is disclosed. In formula (1), each of $R_1$ to $R_{16}$ independently represents a hydrogen atom or a substituent group, provided that at least one of $R_1$ to $R_{16}$ represents an $R_{17}$—X— group or that the compound represented by formula (1) contains at least one condensed-ring structure in which any adjacent two of $R_1$ to $R_{16}$ form a ring; X represents —S—, —NH—, —$NR_{18}$—, or —O—; each of $R_{17}$ and $R_{18}$ independently represents an aliphatic group or an aryl group; and M represents two atoms selected from the group consisting of hydrogen atoms and monovalent metal atoms, or a divalent metal atom, or a divalent substituted metal atom moiety including a trivalent or tetravalent metal atom and a substituent group.

Formula (1)

11 Claims, No Drawings

INFRARED ABSORBING COMPOSITION, INFRARED ABSORBING INK, RECORDED ARTICLE, IMAGE RECORDING METHOD, AND IMAGE DETECTING METHOD

CROSS-REFERENCE TO RELATED APPLICATION

This application is based on and claims priority under 35 USC 119 from Japanese Patent Application No. 2010-113286 filed on May 17, 2010, the disclosure of which is incorporated herein by reference.

BACKGROUND OF THE INVENTION

1. Technical Field

The present invention relates to an infrared absorbing composition, and to an infrared absorbing ink, a recorded article, an image recording method, and an image detecting method using the same.

2. Description of Related Art

Near-infrared absorbing coloring materials which do not substantially absorb visible light but absorb infrared light have been widely used for various kinds of optoelectronics products such as near-infrared absorbing filters.

As in a security-related devices such as those for text or image validation, for example, the optoelectronics products may be exposed to high temperature, high humidity, or light irradiation depending on the use pattern, such as outdoor use. For such reasons, it is important that the near-infrared absorbing coloring materials used remain stable over a long period of time, and it is required that the near infrared absorbing coloring materials are stable so that performance deterioration such as degradation over time is unlikely to occur. In particular, it is essential for the coloring material itself to have resistance to light to maintain high product quality for a long period of time.

With regard to technology related to the above, a naphthalocyanine near-infrared absorbing agent or an alkyl phthalocyanine near-infrared absorbing agent having a specific structure is proposed as a near-infrared absorbing agent having excellent light resistance, weather resistance, and heat resistance (for example, see Japanese Patent Application Laid-Open (JP-A) No. 2-43269 and JP-A No. 2-138382).

As a near-infrared absorbing ink which exhibits almost no absorption of visible light, a near-infrared absorbing ink having excellent light resistance due to containing a specific naphthalocyanine compound is disclosed (for example, see, JP-A No. 3-79683).

SUMMARY OF THE INVENTION

However, the conventional infrared absorbing agents as described above do not exhibits sufficient performance that is required for an infrared absorbing agent, such as with respect to absorption wavelength and weather resistance, and more improved performance, in particular, with respect to light resistance, is required.

Meanwhile, from the viewpoint of use pattern, etc., infrared absorbing agents exhibiting solubility a medium have been generally used. However, infrared absorbing coloring materials that dissolve in a medium such as an organic solvent may not exist stably by themselves due to their solubility. For such reasons, there has been a problem in that it is impossible to have high light resistance that can be maintained for a long period of time under any environmental condition.

Various suggestions have been made in relation to techniques for inhibiting degradation of the coloring material caused by light. However, in reality, sufficient inhibition of degradation of the coloring material caused by light is yet to be achieved.

The invention has been made in view of the above, and provides an infrared absorbing composition, an infrared absorbing ink, a recorded article, an image recording method, and an image detecting method.

According a first aspect of the present invention, an infrared absorbing composition including a compound that is represented by the following formula (1) and has solubility of 30 mg/mL or less in toluene at 25° C., an organic solvent having a solubility parameter in the range of from 7.3 to 12.1, and a resin, is provided.

Formula (1)

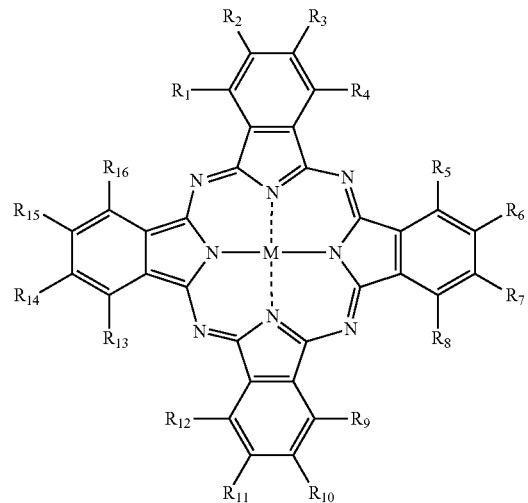

In formula (1), each of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ independently represents a hydrogen atom or a substituent group, provided that at least one of $R_1$ to $R_{16}$ represents an $R_{17}$—X— group or that the compound represented by formula (1) contains at least one condensed-ring structure in which any adjacent two of $R_1$ to $R_{16}$ form a ring; X represents —S—, —NH—, —$NR_{18}$—, or —O—; each of $R_{17}$ and $R_{18}$ independently represents an aliphatic group or an aryl group; and M represents two atoms selected from the group consisting of hydrogen atoms and monovalent metal atoms, or a divalent metal atom, or a divalent substituted metal atom moiety including a trivalent or tetravalent metal atom and a substituent group.

According to a second aspect of the present invention, an infrared absorbing ink including the infrared absorbing composition of the first aspect is provided.

According to a third aspect of the present invention, a recorded article including a recording medium and an image formed thereon using the infrared absorbing ink of the second aspect, is provided.

According to a fourth aspect of the present invention, an image recording method including recording an image by applying on a recording medium the infrared absorbing ink of the second aspect, is provided.

According to a fifth aspect of the present invention, an image detection method including detecting, by an infrared ray detection device, image information of the image formed by the image recording method of the fourth aspect on the recording medium, is provided.

DETAILED DESCRIPTION OF THE INVENTION

Herein below, the infrared absorbing composition, infrared absorbing ink, recorded article, image recording method, and image detecting method according to the invention are explained in greater detail.

<Infrared Absorbing Composition>

The infrared absorbing composition according to the invention includes (A) a compound that is represented by the following formula (1) and has solubility of 30 mg/mL or less in toluene at 25° C. (herein below, it may be referred to as the "IR coloring material of the invention"), (B) an organic solvent having a solubility parameter (i.e., SP value) in the range of from 7.3 to 12.1, and (C) a resin.

Depending on various conditions such as use and use environment, or depending on the necessity, the infrared absorbing composition of the invention may include a polymerizable compound other than the organic solvent described above and/or a polymerization initiator. One or more additional components such as surfactant, solvent, and/or resin curing agent may be included in the infrared absorbing composition.

According to the invention, the infrared absorbing composition includes, as an infrared absorbing agent, a phthalocyanine-based coloring material having low solubility in an organic solvent, so that the infrared absorbing coloring material may be present in a solid state in the composition, a liquid such as an ink using the composition, or an image obtained by using the composition. As a result, compared to a case in which a conventional and relatively soluble infrared absorbing coloring material is used, state of the coloring material in the composition is stabilized, and therefore the resistance to light (i.e., light resistance) may be drastically improved.

(A) Compound Represented by Formula (1)

The infrared absorbing composition of the invention includes, as an infrared absorbing, at least one kind of compound that is represented by the following formula (1) and has solubility of 30 mg/mL or less in toluene at 25° C. (the IR coloring material of the invention). The IR coloring material of the invention is a phthalocyanine-based coloring material as shown in the following structure.

Having solubility of 30 mg/mL or less in toluene at 25° C. indicates that the IR coloring material of the invention is hardly soluble in an organic solvent. When the solubility of the IR coloring material of the invention is more than 30 mg/mL, it becomes difficult to have the IR coloring material in a solid state, and as a result, stability against light (i.e., light resistance) may not be maintained for a long period of time.

From the viewpoint of maintaining better light resistance for a long period of time, the solubility (25° C.) is preferably 5 mg/mL or less, more preferably 1 mg/mL or less, and still more preferably 0.1 mg/mL or less.

The solubility of the infrared absorbing coloring material (i.e., the IR coloring material) in toluene (25° C.) is obtained according to the following method. Specifics are as follows.

First, a tetrahydrofuran (THF) solution prepared by adding the IR coloring material to TI-IF is measured by a spectrophotometer and a calibration curve is constructed. Next, a liquid is prepared by adding the IR coloring material to toluene to the level that there is a part of the coloring material left undissolved. The resulting liquid is subjected to ultrasonication for 10 minutes while being maintained at 25° C., and allowed to stand overnight at 25° C. The THF solution obtained after the standing is filtered using a 0.2 μm filter. The filtrate is diluted so that it falls within the linear range of the calibration curve, the absorbance is measured, and quantification is made using the calibration curve.

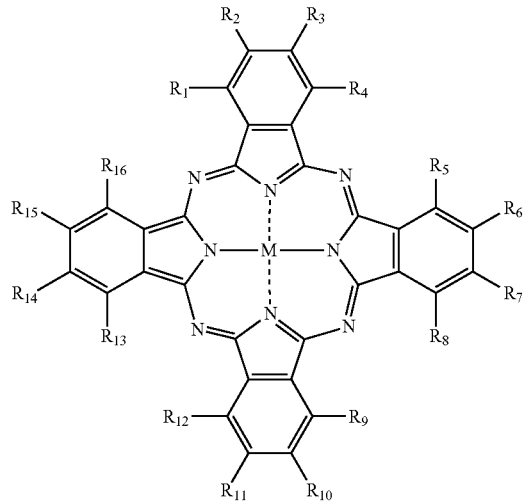

Formula (1)

In formula (1), $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ each independently represent a hydrogen atom or a substituent group, and at least one of $R_1$ to $R_{16}$ represents an $R_{17}$—X— group or that the compound represented by formula (1) contains at least one condensed-ring structure in which any adjacent two of $R_1$ to $R_{16}$ form a ring. X represents —S—, —NH—, —$NR_{18}$—, or —O—, and $R_{17}$ and $R_{18}$ each independently represent an aliphatic group or an aryl group. M represents two atoms selected from the group consisting of hydrogen atoms and monovalent metal atoms, or a divalent metal atom, or a divalent substituted metal atom moiety including a trivalent or tetravalent metal atom and a substituent group.

The substituent group represented by $R_1$ to $R_{16}$ each may be any substitutent group. Examples thereof include an aliphatic group, an aryl group, a heterocyclic group, a N-alkylacylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, a sulfamoyl group, an aliphatic sulfonamide group, an arylsulfonamide group, an aliphatic amide group, an arylamide group, an aliphatic amino group, an arylamino group, an aliphatic oxycarbonylamino group, an aryloxycarbonylamino group, an aliphatic thio group, an arylthio group, a hydroxy group, a cyano group, a sulfo group, a carboxyl group, a carbamoylamino group, a sulfamoylamino group, and a halogen atom.

Herein, the "aliphatic" may have a linear, branched, or cyclic aliphatic moiety, either saturated or unsaturated. Examples thereof include an alkyl group, an alkenyl group, a cycloalkyl group, and a cycloalkenyl group. The aliphatic group may be either unsubstituted or substituted with a substituent group. An aliphatic group having a total of from 1 to 15 carbon atoms is preferred as an aliphatic group.

The "aryl" may be any one of a monocycle and a condensed-cycle, and it may be either unsubstituted or substituted with a substituent group. The "heterocycle" indicates that the heterocyclic moiety has a hetero atom (for example, a nitrogen atom, a sulfur atom, or an oxygen atom) in the ring, and it may be any one of a saturated cycle and an unsaturated cycle, any one of a monocycle and a condensed-cycle, and either unsubstituted or substituted with a substituent group.

Among those described above, a substituent group represented by $R_1$ to $R_{16}$ is preferably an aliphatic group, an aryl group, an aliphatic oxy group, an aryloxy group, an aliphatic thio group, an arylthio group, an aliphatic amino group, an arylamino group, and a halogen atom.

The aliphatic group may be either unsubstituted or substituted with a substituent group, and either saturated or unsaturated. It may be cyclic. Preferably, it is an aliphatic group having a total of from 1 to 15 carbon atoms. More preferably, it is an aliphatic group having a total of from 1 to 10 carbon atoms. Examples of the aliphatic group include an alkyl group such as a methyl group, an ethyl group, a propyl group, a butyl group, a nonyl group, a dodecyl group, an octadecyl group, and a 2-ethylhexyl group, and an alkenyl group such as a vinyl group, an allyl group, an ethynyl group, and an isopropenyl group.

The aryl group may be either unsubstituted or substituted with a substituent group. Preferably, it is an aryl group having a total of from 6 to 16 carbon atoms. More preferably, it is an aryl group having a total of from 6 to 12 carbon atoms. Examples thereof include a phenyl group, a 4-nitrophenyl group, a 2-nitrophenyl group, a 2-chlorophenyl group, a 2,4-dichlorophenyl group, a 2,4-dimethylphenyl group, a 2-methylphenyl group, a 4-methoxyphenyl group, a 2-methoxyphenyl group, and a 2-methoxycarbonyl 4-nitrophenyl group.

The aliphatic oxy group may be either unsubstituted or substituted with a substituent group, and either saturated or unsaturated. It may be cyclic. Preferably, it is an aliphatic oxy group having a total of from 1 to 12 carbon atoms. More preferably, it is an aliphatic oxy group having a total of from 1 to 10 carbon atoms. Examples thereof include a methoxy group, an ethoxy group, a propoxy group, an ethoxy ethoxy group, a phenoxy ethoxy group, and a thiophenoxy ethoxy group.

The aryloxy group may be either unsubstituted or substituted with a substituent group. Preferably, it is an aryloxy group having a total of from 6 to 16 carbon atoms in the aryl moiety. More preferably, it is an aryloxy group having a total of from 6 to 12 carbon atoms in the aryl moiety. Examples of the aryl moiety include phenyl, 4-nitrophenyl, 2-nitrophenyl, 2-chlorophenyl, 2,4-dichlorophenyl, 2,4-dimethylphenyl, 2-methylphenyl, 4-methoxyphenyl, 2-methoxyphenyl, and 2-methoxycarbonyl-4-nitrophenyl.

The aliphatic thio group may be either unsubstituted or substituted with a substituent group, and either saturated or unsaturated. It may be cyclic. As for the aliphatic thio group, an aliphatic thio group having a total of from 1 to 16 carbon atoms is preferred. An aliphatic thio group having a total of from 1 to 10 carbon atoms is more preferred. Examples thereof include a methylthio group, an ethylthio group, and an ethoxy ethylthio group.

The arylthio group may be either unsubstituted or substituted with a substituent group. Preferably, it is an arylthio group having a total of from 6 to 22 carbon atoms. More preferably, it is an arylthio group having a total of from 6 to 14 carbon atoms. Examples thereof include a phenylthio group.

The aliphatic amino group may be either unsubstituted or substituted with a substituent group, and either saturated or unsaturated. It may be cyclic. As for the aliphatic amino group, an aliphatic amino group having a total of from 1 to 16 carbon atoms is preferred. An aliphatic amino group having a total of from 1 to 10 carbon atoms is more preferred. Examples thereof include a methylamino group and an ethylamino group.

The arylamino group may be either unsubstituted or substituted with a substituent group. Preferably, it is an arylamino group having a total of from 6 to 22 carbon atoms. More preferably, it is an arylamino group having a total of from 6 to 14 carbon atoms. Examples thereof include an anilino group.

Examples of the halogen atom include a chlorine atom, a bromine atom, and an iodine atom. A chlorine atom is preferred.

At least one of $R_1$ to $R_{16}$ in formula (1) represents an $R_{17}$—X— group or the compound represented by formula (1) includes at least one condensed-ring structure in which any adjacent two of $R_1$ to $R_{16}$ (e.g.: $R_2$ and $R_3$, $R_6$ and $R_7$, etc.) form a ring. X represents —S—, —NH—, —$NR_{18}$—, or —O—, and $R_{17}$ and $R_{18}$ each independently represent an aliphatic group or an aryl group.

The aliphatic group represented by $R_{17}$ and $R_{18}$ has the same definitions as the aliphatic group represented by $R_1$ to $R_{16}$ above, and also has the same preferred definitions as the aliphatic group represented by $R_1$ to $R_{16}$ above. The aryl group represented by $R_{17}$ and $R_{18}$ has the same definitions as the aryl group represented by $R_1$ to $R_{16}$ above, and also has the same preferred definitions as the aryl group represented by $R_1$ to $R_{16}$ above.

Among examples of the $R_{17}$—X— group, from the viewpoint of having low solubility in a solvent and having more favorable light resistance, preferable examples includes $R_{17}$—S— groups and $R_{17}$—O— groups, and more preferable examples include $R_{17}$—S— groups. Among them, an $R_{17}$—X— group wherein $R_{17}$ is an aryl group is particularly preferred.

When any adjacent two of $R_1$ to $R_{16}$ form a ring so as to form a condensed-ring structure, a structure in which $R_2$ and $R_3$, $R_6$ and $R_7$, $R_{10}$ and $R_{11}$, and/or $R_{14}$ and $R_{15}$ among $R_1$ to $R_{16}$ are bonded to each other to form a ring is preferred. As for such ring structure, a naphthalene ring in which a 6-membered aromatic ring is condensed to a benzene ring to which $R_1$ and the like is bonded (i.e., naphthalocyanine structure) and a ring structure represented by the following structural formula (A) in which a 6-membered aliphatic ring is condensed to a benzene ring to which $R_1$ and the like is bonded are preferred.

In the following structural formula (A), X and Y each independently have the same definitions as X as described for $R_1$ to $R_{16}$ above. Preferably, it is —S— or —O—. $R_a$ and $R_b$ each independently represent a hydrogen atom or a substituent group. This substituent group has the same definitions as the substituent group that is represented by $R_1$ to $R_{16}$ above, and also has the same preferred definitions as the substituent group that is represented by $R_1$ to $R_{16}$ above. $R_a$ and $R_b$ may be bonded to each other to form a ring structure (for example, a benzene ring).

Structural formula (A)

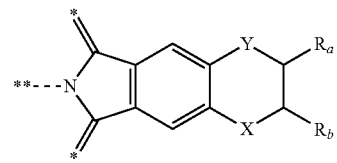

M in formula (1) represents two atoms selected from the group consisting of hydrogen atoms and monovalent metal atoms, or a divalent metal atom, or a divalent substituted metal atom moiety including a trivalent or tetravalent metal atom and a substituent group. Preferred examples of M include two hydrogen atoms, a divalent metal atom, a divalent metal oxide, a divalent metal hydroxide, and a divalent metal chloride.

Specific examples of M include VO, TiO, Zn, Mg, Si, Sn, Rh, Pt, Pd, Mo, Mn, Pb, Cu, Ni, Mg, Sn, Pd, Co, Fe, AlCl, InCl, FeCl, TiCl$_2$, SnCl$_2$, SiCl$_2$, GeCl$_2$, Si(OH)$_2$, and H$_2$.

Among them, from the viewpoint of having low solubility in a solvent, M is preferably VO, Zn, Cu, Mn, Ni, Mg, Sn, Pd, Co, or H$_2$. M is more preferably Cu, VO, or Zn, and still more preferably Cu.

The phthalocyanine skeleton has a structure in which four benzene rings are condensed to the outside of the tetraazaporphyrin skeleton, and there are four positions (carbon atoms) in each benzene ring to which a substituent group may be attached. From the viewpoint of having low solubility in a solvent and showing favorable resistance to light, a compound in which a hydrogen atom is bonded at two p positions, that are far from the tetraazaporphyrin skeleton, of each benzene ring, is preferred as a compound represented by formula (1) of the invention (the IR coloring material). Further, a compound in which an R$_{17}$—X— group wherein R$_{17}$ is an aryl group is bonded at two a positions, that are close to the tetraazaporphyrin skeleton, of each benzene ring, and a hydrogen atom is bonded at two β positions, that are far from the tetraazaporphyrin skeleton, of each benzene ring, is preferred. In such case, M is preferably Cu for the same reason.

Among the compounds represented by formula (1), from the viewpoint of having low solubility in a solvent and showing better resistance to light, a compound represented by the following formula (1a) or the following formula (1b) is preferable.

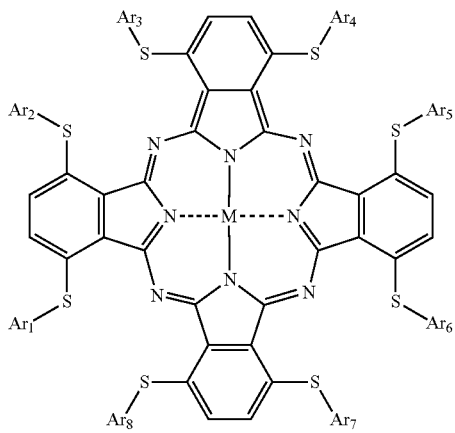

Formula (1a)

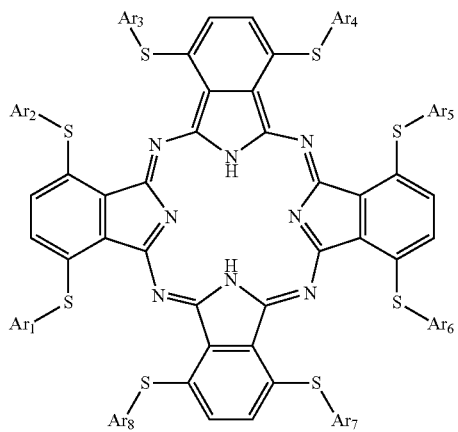

Formula (1b)

In formula (1a), M represents two atoms selected from the group consisting of hydrogen atoms and monovalent metal atoms, or a divalent metal atom, or a divalent substituted metal atom moiety including a trivalent or tetravalent metal atom and a substituent group.

Examples of M include two hydrogen atoms, a divalent metal atom, a divalent metal oxide, a divalent metal hydroxide, and a divalent metal chloride. Specific examples are the same as those described for M in formula (1). Among them, from the viewpoint of having low solubility in a solvent, M is preferably VO, Zn, Cu, Mn, Ni, Mg, Sn, Pd, Co, or H$_2$. More preferably, it is Cu, VO, or Zn. Still more preferably, it is Cu.

In formula (1a) and formula (1 b), Ar$_1$, Ar$_2$, Ar$_3$, Ar$_4$, Ar$_5$, Ar$_6$, Ar$_7$, and Ar$_8$ each independently represent a substituted or unsubstituted aryl group. Ar$_1$ to Ar$_8$ may be the same or different from one another.

The aryl group represented by Ar$_1$ to Ar$_8$ above may be unsubstituted or substituted with a substituent group. Preferably, it is an aryl group having a total of from 6 to 16 carbon atoms. More preferably, it is an aryl group having a total of from 6 to 12 carbon atoms. Among them, an alkylphenyl group and/or an alkoxyphenyl group (preferably, the number of carbon atoms in the alkyl moiety in each group is from 1 to 10) are preferable. Specifically, Ar$_1$ to Ar$_8$ may each independently represent an alkylphenyl group or an alkoxyphenyl group (preferably the number of carbon atoms in the alkyl moiety in each group is from 1 to 10). Ar$_1$ to Ar$_8$ may each represent an alkylphenyl group (preferably the number of carbon atoms in the alkyl moiety in each group is from 1 to 10). Ar$_1$ to Ar$_8$ may each represent an alkylphenyl group (preferably the number of carbon atoms in the alkyl moiety in each group is from 1 to 10). Examples of the aryl group include a phenyl group, a 2,4-dimethylphenyl group, a 2-methylphenyl group, a 2-ethylphenyl group, a 4-methoxyphenyl group, a 2-methoxyphenyl group, a 4-octyloxyphenyl group, and a 4-t-butylphenyl group.

Herein below, specific examples of the compound represented by formula (1) are given. However, the invention is not limited to those exemplary compounds.

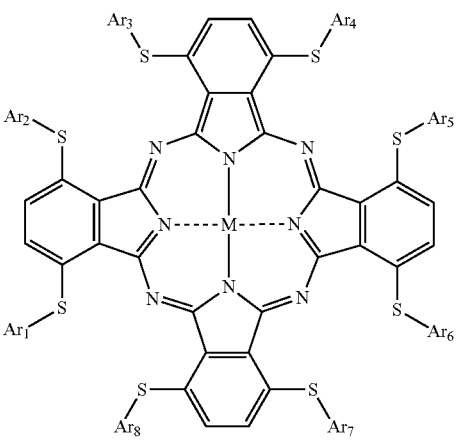
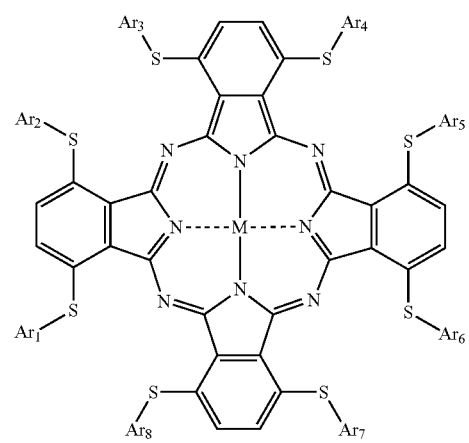
| Compound | M | Ar₁ to Ar₈ |
|---|---|---|
| 1 | Cu | 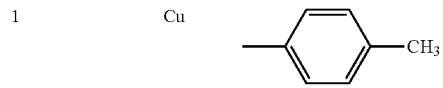 |
| 2 | Cu | |
| 3 | Cu | |
| 4 | Cu | |
| 5 | Cu | 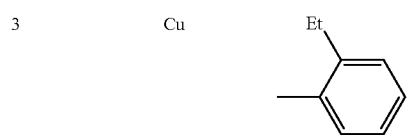 |
| 6 | Cu | |
| 7 | Cu | |
| 8 | Cu | |
| 9 | V=O | 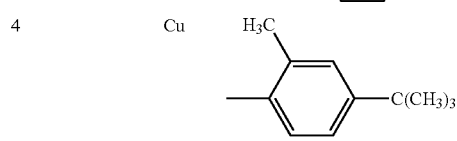 |
| Compound | M | Ar₁ to Ar₈ |
|---|---|---|
| 10 | V=O | 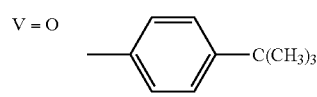 |
| 11 | Zn | 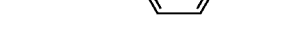 |
| 12 | Zn | |
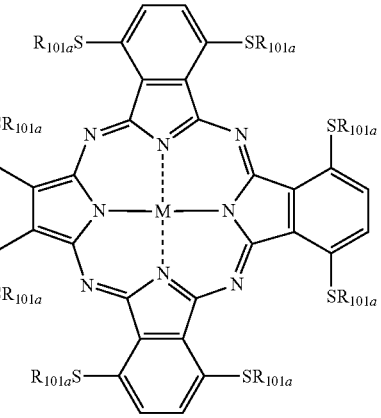
| Compound | M | $R_{101a}$ |
|---|---|---|
| 13 | 2H | $(CH_2)_7CH_3$ |
| 14 | 2H | $(CH_2)_{11}CH_3$ |
| 15 | Cu | $(CH_2)_7CH_3$ |
| 16 | Cu | $(CH_2)_{11}CH_3$ |
| 17 | Cu | $CH_3$ |
| 18 | Zn | $(CH_2)_7CH_3$ |
| 19 | V=O | $(CH_2)_{11}CH_3$ |

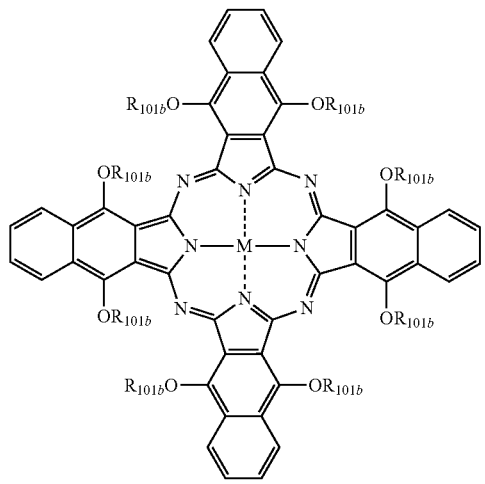

| Compound | M | $R_{101b}$ |
|---|---|---|
| 20 | 2H | $(CH_2)_7CH_3$ |
| 21 | 2H | $(CH_2)_{11}CH_3$ |
| 22 | Cu | $CH_3$ |
| 23 | Cu | $C_2H_5$ |
| 24 | Cu | $(CH_2)_3CH_3$ |
| 25 | Cu | $(CH_2)_7CH_3$ |
| 26 | Cu | $(CH_2)_{11}CH_3$ |
| 27 | Zn | $(CH_2)_7CH_3$ |
| 28 | V=O | $(CH_2)_{11}CH_3$ |

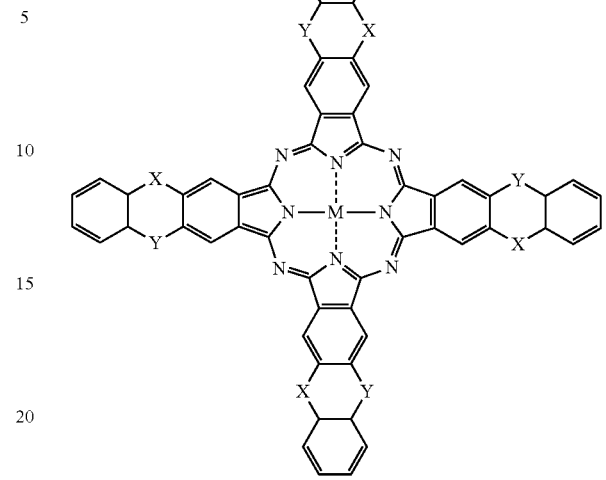

| Compound | M | X | Y |
|---|---|---|---|
| 38 | 2H | O | O |
| 39 | 2H | S | NH |
| 40 | 2H | NH | NH |
| 41 | Cu | O | O |
| 42 | Cu | S | NH |
| 43 | Cu | NH | NH |
| 44 | Cu | NMe | NMe |
| 45 | Cu | S | NMe |
| 46 | Cu | NMe | NMe |
| 47 | Zn | O | O |
| 48 | Zn | S | NH |
| 49 | Zn | NH | NH |
| 50 | V=O | O | O |
| 51 | V=O | S | NH |
| 52 | V=O | NH | NH |

| Compound | M | X | $R_{102a}$ |
|---|---|---|---|
| 29 | 2H | O | $(CH_2)_7CH_3$ |
| 30 | 2H | NH | $(CH_2)_{11}CH_3$ |
| 31 | Cu | NH | $CH_3$ |
| 32 | Cu | $N(C_2H_5)$ | $C_2H_5$ |
| 33 | Cu | O | $(CH_2)_3CH_3$ |
| 34 | Cu | O | $(CH_2)_7CH_3$ |
| 35 | Cu | NH | $(CH_2)_{11}CH_3$ |
| 36 | Zn | NH | $(CH_2)_7CH_3$ |
| 37 | V=O | NH | $(CH_2)_{11}CH_3$ |

| Compound | M | $R_{103a}$ | $R_{104a}$ | $R_{105a}$ | $R_{106a}$ |
|---|---|---|---|---|---|
| 53 | 2H | H | NHPh | NHPh | H |
| 54 | 2H | H | $O(CH_2)_3CH_3$ | $O(CH_2)_3CH_3$ | H |
| 55 | 2H | NHMe | NHMe | NHMe | NHMe |
| 56 | Cu | H | NHPh | NHPh | H |
| 57 | Cu | H | $O(CH_2)_3CH_3$ | $O(CH_2)_3CH_3$ | H |
| 58 | Cu | NHMe | NHMe | NHMe | NHMe |

-continued

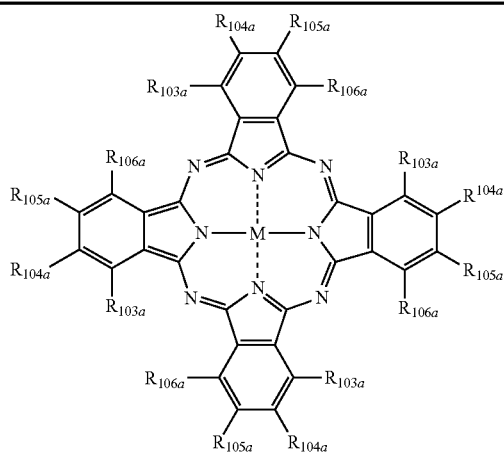

| Compound | M | $R_{103a}$ | $R_{104a}$ | $R_{105a}$ | $R_{106a}$ |
|---|---|---|---|---|---|
| 59 | Cu | $O(CH_2)_3CH_3$ | $O(CH_2)_3CH_3$ | $O(CH_2)_3CH_3$ | $O(CH_2)_3CH_3$ |
| 60 | Cu | $O(CH_2)_3CH_3$ | NMe | NMe | $(CH_2)_7CH_3$ |
| 61 | Cu | $O(CH_2)_3CH_3$ | Cl | Cl | $O(CH_2)_3CH_3$ |
| 62 | Zn | H | NHPh | NHPh | H |
| 63 | Zn | H | $O(CH_2)_3CH_3$ | $O(CH_2)_3CH_3$ | H |
| 64 | Zn | NHMe | NHMe | NHMe | NHMe |
| 65 | V=O | H | NHPh | NHPh | H |
| 66 | V=O | H | $O(CH_2)_3CH_3$ | $O(CH_2)_3CH_3$ | H |
| 67 | V=O | NHMe | NHMe | NHMe | NHMe |

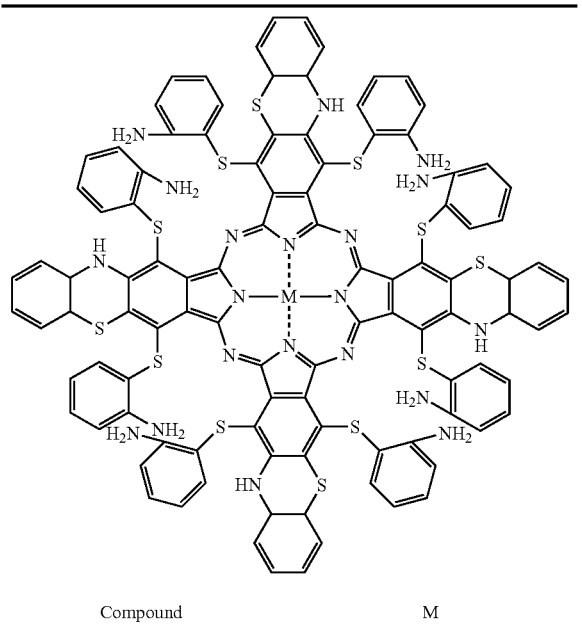

| Compound | M |
|---|---|
| 68 | 2H |
| 69 | Cu |
| 70 | Zn |
| 71 | V=O |
| 72 | Sn |
| 73 | Pd |
| 74 | Mg |
| 75 | Ni |

The IR coloring material of the invention may be synthesized according to a conventionally known synthetic method.

The content of the IR coloring material(s) in the infrared absorbing composition of the invention is preferably from 0.01 to 99% by mass, and more preferably from 0.1 to 90% by mass with respect to the total mass of the composition. When the content of the IR coloring material(s) is 0.01% by mass or more, favorable light resistance may be obtained and, therefore, readability is excellent when recorded as an image. When the content of the IR coloring material(s) is 99% by mass or less, it is advantageous in terms of printing property at the time of printing, friction resistance of a printed article, storage stability, and the like.

In addition to the IR coloring material as described above, an infrared absorbing coloring material represented by formula (2) below may be used together with the above-described IR coloring material.

Formula (2)

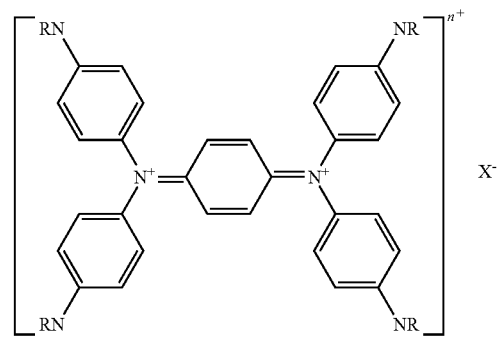

In formula (2), R represents a hydrogen atom or an aliphatic group having 1 to 12 carbon atoms, n represents 1 or 2, and X represents an anion.

Herein below, specific examples of the infrared absorbing coloring material represented by formula (2) are described. However, in the present invention, the coloring material represented by formula (2) is not limited to them.

| Compound | R | $X^-$ |
|---|---|---|
| 101 | $CH_3$ | $ClO_4^-$ |
| 102 | $CH_3$ | $BF_4^-$ |
| 104 | $CH_3$ | $CF_3COO^-$ |
| 105 | $CH_3$ | $SbF_6^-$ |
| 106 | $C_2H_5$ | $PhSO_3^-$ |
| 107 | $C_2H_5$ | $ClO_4^-$ |
| 108 | $(CH_2)_3CH_3$ | $ClO_4^-$ |
| 109 | $(CH_2)_3CH_3$ | $BF_4^-$ |
| 110 | $(CH_2)_3CH_3$ | $(CF_3SO_2)_2N^-$ |
| 111 | $(CH_2)_3CH_3$ | $SbF_6^-$ |
| 112 | $CH_2CH(C_2H_5)(CH_2)_3CH_3$ | $ClO_4^-$ |
| 113 | $CH_2CH(C_2H_5)(CH_2)_3CH_3$ | $BF_4^-$ |
| 114 | $CH_2CH(C_2H_5)(CH_2)_3CH_3$ | $(CF_3SO_2)_2N^-$ |
| 115 | $(CH_2)_{11}CH_3$ | $ClO_4^-$ |
| 116 | $(CH_2)_{11}CH_3$ | $BF_4^-$ |

(B) Organic Solvent

The infrared absorbing composition of the invention contains at least one kind of organic solvent which has the solubility parameter (herein below, abbreviated as "SP value") in the range of from 7.3 to 12.1. By using an organic solvent having the SP value in this range, it is possible to have the IR coloring material of the invention be present in a solid-dispersed state.

The organic solvent used in the invention has the SP value in the range of 7.3 to 12.1. When the SP value is not within the range, solubility of the IR coloring material of the invention may tend to increase, which may cause reduction in light resistance improving effect. Specifically, when the SP value is lower than 7.3 or higher than 12.1, stability of an ink may become problematic, for example, a change in the reflection spectrum of a printed article may occur before and after the storage over time in a ink state.

When two or more kinds of organic solvent are mixed and used, the weighted-average SP value based on the use amounts of the mixed organic solvents is in the range of from 7.3 to 12.1.

The SP value is a solubility parameter calculated according to the Fedors method (unit: $(cal/cm_3)^{1/2}$), and it corresponds to a value expressed by the following equation.

$$\text{SP value}(\delta) = (\Delta H/V)^{1/2}$$

In the equation, $\Delta H$ indicates molar heat of vaporization (cal) and V indicates molar volume ($cm^3$). The sum of the molar heat of vaporization of atomic groups ($\Delta ei$), i.e., $\Sigma\Delta ei$ ($=\Delta H$), and the sum of molar volume ($\Delta vi$), i.e., $\Sigma\Delta vi(V)$, may be used as $\Delta H$ and V, respectively, as described in "POLYMER ENGINEERING AND SCIENCE, 1974, Vol. 14, No. 2, ROBERT F. FEDORS. (pages 151 to 153)," and thus the SP value is obtained as $(\Sigma\Delta ei/\Sigma\Delta vi)^{1/2}$.

Examples of the organic solvent which may be used in the invention include aromatic hydrocarbons, aliphatic hydrocarbons, ketones, esters, ethers, alcohols, and liquid-phase polymerizable compounds.

Examples of the aromatic or aliphatic hydrocarbon include n-hexane (SP value: 7.3), n-octane (SP value: 7.6), toluene (SP value: 8.9), ethyl benzene (SP value: 8.8), xylene (SP value: 8.8), and benzene (SP value: 9.2).

Examples of the ketone include methyl isobutyl ketone (SP value: 8.3), methyl isopropyl ketone (SP value: 8.5), methyl ethyl ketone (SP value: 9.3), and methyl propyl ketone (SP value: 8.7).

Examples of the ester include ethyl acetate (SP value: 9.1), butyl acetate (SP value: 8.5), isobutyl acetate (SP value: 8.3), isopropyl acetate (SP value: 8.4), ethylene glycol monobutyl ether acetate (SP value: 8.9), ethylene glycol monobutyl ether acetate (BMGAC) (SP value: 8.9), and diethylene glycol monoethyl ether acetate (EDGAC) (SP value: 9.0).

Examples of the ether include diethyl ether (SP value: 7.4).

Examples of the alcohol include n-butanol (SP value: 11.4), n-hexanol (SP value: 10.7), isopropyl alcohol (SP value: 11.5), cyclohexanol (SP value: 11.4), diethylene glycol monobutyl ether (BDG) (SP value: 10.5), diethylene glycol monoethyl ether (EDG) (SP value: 10.5), and ethylene glycol monoethyl ether (EMG) (SP value: 11.5).

The polymerizable compound is a monomer compound having a polymerizable group such as ethylenic double bond. Examples thereof include a (meth)acrylic monomer.

Examples of the (meth)acrylic monomer include methyl methacrylate (SP value: 8.6), cyclohexyl methacrylate (SP value: 9.1), n-butyl methacrylate (SP value: 8.6), t-butyl methacrylate (SP value: 8.3), n-butyl acrylate (SP value: 9.2), and allyl methacrylate (SP value: 8.8).

As for the polymerizable compound, commercially available products may be used. Examples of the commercially available product which may be used include KAYARAD series manufactured by Nippon Kayaku Co., Ltd. (for example, KAYARAD TMPTA, KAYARAD DPHA, and KAYARAD TPGDA).

As for the organic solvents which may be used the invention, an organic solvent having the SP value in the range of from 7.3 to 11.5 is preferable. An organic solvent having the SP value in the range of from 7.4 to 11.4 is more preferable.

Among them, preferable examples of the organic solvent include aromatic hydrocarbons, aliphatic hydrocarbons, ketones, esters, alcohols, and polymerizable compounds each having the SP value in the range described above. More preferable examples include aromatic hydrocarbons, aliphatic hydrocarbons, ketones, esters, and polymerizable compounds each having the SP value in the range described above are more preferable.

Only one kind of organic solvent may be used singly. However, from the viewpoint of further increasing the light resistance improving effect, it is preferable to use two or more kinds of organic solvents in combination.

As an embodiment of using two or more kinds of an organic solvent in combination, from the viewpoint of having low solubility and light resistance improving effect of the IR coloring material of the invention, combined use of an aromatic or aliphatic hydrocarbon and a ketone is preferable. Combined use of an aromatic hydrocarbon and a ketone is more preferable. An embodiment in which toluene and methyl isobutyl ketone are used in combination is still more preferable.

When the polymerizable compound (i.e., a monomer) is used as an organic solvent, it is preferable to use two or more kinds of polymerizable compound in combination.

The content of the organic solvent(s) in the infrared absorbent composition of the invention is preferably 1 to 1,000,000% by mass, and more preferably 10 to 500,000% by mass, compared to the IR coloring material(s) of the invention. When the content of the organic solvent(s) is 1% by mass or more, dispersability and stability over time of the IR coloring material may be more favorable. The content is 1,000,000% by mass or less may be advantageous in terms of reading sensitivity of desired IR absorption.

From the viewpoint of exhibiting stable light resistance over a long period of time, using one or more kinds of the compounds represented by formula (1a) or formula (1b) as an IR coloring materials and one or more organic solvents having the SP value in the range of from 7.4 to 11.4 is preferable in the invention. Using the compound 1 as an IR coloring material and one or more kinds of organic solvents selected from the group consisting of aromatic hydrocarbons and ketones (for example, an aromatic hydrocarbon, a ketone, a combination of an aromatic hydrocarbon and a ketone, or the like) is more preferable.

(C) Resin

The infrared absorbing composition of the invention contains at least one kind of resin. Resin is not particularly limited, and may be selected depending on specific use and purpose, etc.

Suitable examples of the resin include rosin, modified rosin, rosin derivatives, modified rosin derivatives, petroleum resins, dicyclopentadiene resins and modified dicyclopentadiene resins.

The rosin is a natural resin which contains rosin acid as a main component. Examples of modified rosin and derivatives of modified rosin include polymerized rosin (for example, rosin acid ester resin, etc.), disproportionated rosin, hydrogenated rosin, and maleic acid modified rosin.

The petroleum resin is a polymerized product of unsaturated compounds a having high carbon number that are generated by naphtha decomposition, and it includes an aliphatic-based resin having C5 fraction as raw material, an aromatic-based resin having C9 fraction as raw material, and a copolymer-based resin. Examples of the petroleum resin include dicyclopentadiene-based petroleum resin and aromatic-based petroleum resin.

Examples of the modified dicyclopentadiene resin include a modified product such as a resin modified with unsaturated polyester and a resin modified with phenol.

The content of the resin(s) in the infrared absorbent composition is preferably from 1% to 99%, and more preferably from 10% to 98% by mass ratio with respect to the total solid matter in the composition. When the resin content is 1% by mass or more, it is advantageous in terms of resistance of a printed article to a solvent. From the viewpoint of having reading sensitivity of a printed article by IR light, it may be set to 99% by mass or less.

(D) Other Components

The infrared absorbing composition of the invention may be prepared by using, in addition to the components as described above, one or more additional components such as a surfactant, a solvent other than the above-described organic solvents, a curing agent for resin, an electro-donating chromogenic organic compound, an electron-accepting compound, and a polar organic compound, if necessary.

Examples of the surfactant which may be used include non-ionic surfactants, example thereof including alkylene oxide-based surfactants, glycerin-based surfactants, glycidol-based surfactants, and alkylphenol ethylene oxide adduct-based surfactants; cationic surfactants, examples thereof including cyclic amines, ester amides, quaternary ammonium salts, hydantoin derivatives, heterocycles, phosphoniums and sulfoniums; anionic surfactants having an acidic group such as carboxyl group, sulfonic acid group, and sulfate group; and amphoteric surfactants, examples thereof including amino acids, aminosulfonic acids, sulfate esters of amino alcohol, phosphate esters of amino alcohol, and alkyl betaines.

With regard to the surfactant, detailed information is given in "Handbook of Surfactants" (published by SANGYO-TOSHO Publishing Co., Ltd.). It is not necessary to use a pure surfactant. Impurities such as an isomer, a non-reacted material, a by-product, a degraded product, and an oxide may be included in addition to the main component. The impurities are preferably 30% by mass or less, and more preferably 10% by mass or less.

Only one kind of the surfactant may be used singly, or two or more of kinds thereof may be used in combination.

The infrared absorbing composition of the invention may be prepared by dispersing in advance the IR coloring material in the organic solvent and adding the resin thereto. In such case, a dispersant for dispersing the IR coloring material used in the invention may be included. The surfactant may be used as a dispersant, as in addition to a usage as an additive as described above. The surfactant used as a dispersant is preferably a non-ionic surfactant, an anionic surfactant, or a cationic surfactant. It is more preferably a non-ionic surfactant or an anionic surfactant. Still more preferably, it is an anionic surfactant. Even still more preferably, it is an organic sulfonate metal salt having 40 or less carbon atoms. Even still further more preferably, it is an organic sulfonate metal salt having 30 or less carbon atoms. Most preferably, it is a sodium salt or a potassium salt of an organic sulfonic acid having 25 or less carbon atoms.

When the dispersant is added, as the timing for adding it during the process of dispersing coloring material particles, the dispersant is preferably added together with an IR coloring material to a solvent or after dispersing the IR coloring material in a solvent. Of the two cases, like the former, adding the dispersant during the process of dispersing is most preferable.

Further, within the range that the effect of the invention is not impaired, a solvent other than (B) the organic solvent may be contained. Herein, examples of the solvent include a dispersion medium for dispersion that is described in paragraph number [0071] of JP-A No. 2008-105958.

The infrared absorbing composition of the invention may contain a curing agent for the resin. When, for example, an urethane resin is used as the resin, the curing agent may be a polyisocyanate resin. The curing agent may be used within the range of from 1 to 70% by mass with respect to the resin.

The infrared absorbing composition of the invention may be also constituted to contain an electron-donating chromogenic organic compound, an electron-accepting compound, and/or a polar organic compound as a main component(s) so that it may transiently show a color from transparency according to a change in temperature condition and reversibly exhibit an infrared absorbing property.

The infrared absorbing composition of the invention may be used for preparing a desired infrared absorbing material by, for example, applying it to a method of forming an infrared absorbing layer by dispersing the IR coloring material of the invention in a resin and coating or hard-coating it on a surface of a paper, a resin sheet, a film, a glass, or a metal layer, to a method of preparing an infrared absorbing resin by adding the composition to a resin material such as monomer and neutralizing the mixture, or to a method of preparing an infrared absorbing resin by adding the composition to a resin followed by heat-melting and dispersing the composition in a molten state in a resin.

Among them, an infrared absorbing ink using the infrared absorbing composition of the invention is explained herein below.

<Infrared Absorbing Ink and Recorded Article>

The infrared absorbing ink of the invention is constituted by using the infrared absorbing composition of the invention described above. As the infrared absorbing composition is used therefor, the infrared absorbing ink has excellent light resistance.

The infrared absorbing ink of the invention contains at least (A) the IR coloring material in the invention, (B) the organic solvent, and (C) the resin. Depending on use and purpose, it may be constituted by further using one or more additional components such as a coloring agent, a polymerization initiator, a polymerizable compound not included in the organic solvent, and one or more other additives.

By containing a coloring agent, an ink having a desired hue may be provided. Examples of coloring agents include a dye and a pigment. The coloring agent may be contained within the range that the effect of the invention is not impaired.

When a polymerizable compound or a compound having a polymerizable group such as resin is contained in the ink, by containing a polymerization initiator, the polymerizable group included in the ink may be subjected to polymerization reaction to cure the ink. As a result, strength of a recorded image (for example, rub-off resistance) may be improved.

Any kind of a polymerization initiator may be used if it is a compound capable of generating active species for initiating a polymerization reaction of a polymerizable group such as a monomer component. It may be appropriately selected from known photopolymerization initiators. Examples thereof include a compound containing a trihalomethyl group, an acridine-based compound, an acetophenone-based compound, a bis-imidazole-based compound, a triazine-based compound, a benzoin-based compound, a benzophenone-based compound, an α-diketone-based compound, a polynuclear quinone-based compound, a xanthone-based compound, and a diazo-based compound.

The recorded article of the invention includes an image that is formed by using the infrared absorbing ink of the invention.

Since the infrared absorbing composition of the invention is used therefor, the recorded article of the invention may have better light resistance compared to conventional ones.

Examples of the image formed in the recorded article includes various kinds, for example, a mark such as symbol and dot (example: mark for copy protection), a letter (example: validation letter for security), picture, and bar code.

With regard to an information recording medium having on a desired base a fluorophore section which emits fluorescence when light with specific wavelength is irradiated, an infrared absorbing section which contains the compound represented by formula (1) (i.e., the IR coloring material of the invention) to cover the fluorophore section and does not emit fluorescence may be formed. Further, the infrared absorbing section may be constituted to block a pathway for optical reading of information by an optical information reading unit.

Using a base which reflects infrared light of near-infrared region in at least its surface, an infrared absorbing ink layer containing the compound represented by formula (1) (i.e., the IR coloring material of the invention) may be formed closely or superimposed to an ink layer which is formed on the base and substantially has absorption in visible region but no absorption in near-infrared region, wherein the compound represented by formula (1) (i.e., the IR coloring material of the invention) is employed as an infrared absorbing material which absorbs infrared light in near-infrared region.

<Image Recording Method>

The image recording method related to the invention includes a process of recording an image by applying the infrared absorbing ink of the invention to a recording medium. According to the image recording method of the invention, an image is formed with the infrared absorbing ink in which the infrared absorbing composition as described above is used and, therefore, the recorded image may have excellent light resistance.

Application of the infrared absorbing ink for recording an image may be carried out using a known method such as a coating method, a printing method, or an ink jet method. As a coating method, a bar coating may be used, for example. As a printing method, a Gravure printing, a lithographic printing or the like may be used. As an ink jet method, a charge control type method by which ink ejection is carried out by using electrostatic attraction, a drop-on-demand type method using vibration pressure of a Piezo device (i.e., pressure pulse type method), or a thermal type method which uses pressure generated by air bubbles formed by heating ink (i.e., BUBBLE JET (registered trade mark)), etc. may be used.

After applying the ink, one or more other processes such as a process of drying the ink and/or a process of (heat) pressing the recorded image may be also included.

<Image Detecting Method>

The image detecting method according to the invention includes a process of detecting information of an image by using an infrared detector, wherein the image is formed on a recording medium by the image recording method of the invention as described above. Since the image as a subject to be detected has good light resistance, the detectability (such as readability) may be stably maintained for a long time when detection is made by using an infrared detector.

Detection of image information included in an image is carried out by irradiating the recorded surface of a recorded article having recorded image with infrared light and detecting various image information using an infrared detector. With a non-colored composition, an image section containing the IR coloring material may not be visually recognized or is difficult to be recognized. However, when irradiated with infrared light, the region containing the IR coloring material absorbs infrared light, and therefore by detecting the reflected light or fluorescence at the time of irradiation, image information including pattern information such as a mark such as symbol and dot, a letter, a picture, and a bar code, or location information may be read.

As for the infrared detector, an apparatus for collecting and detecting reflected light, and the like at the time of irradiation may be used. Detection may be appropriately carried out by using a light with wavelength of from 800 to 1,200 nm. As for the light source, a light source for irradiating infrared light may be used. A light source for irradiating light including light of wavelengths other than the infrared light may be used by adding an infrared transmitting filter.

EXAMPLES

Herein below, the invention is described in further detail by reference to examples. However, as long as not departing from of the gist thereof, the invention is not limited by the examples. In addition, unless specifically described otherwise, the "part" is based on the mass.

Example 1

Preparation of Printing Ink

By mixing the components of the composition shown below, the infrared absorbing printing ink (1) was prepared.

| <Composition of infrared absorbing printing ink (1)> | |
|---|---|
| infrared absorbing coloring material shown in Table 1 (IR coloring material) | 20 parts |
| vinyl acetate resin (trade name: S-LEC A, manufactured by SEKISUI CHEMICAL CO., LTD.) | 10 parts |
| saturated polyester (trade name: VYLON 103, manufactured by TOYOBO CO., LTD.) | 5 parts |
| polyurethane elastomer (trade name: N-2304, manufactured by Nippon Polyurethane Industry Co., Ltd.) | 12 parts |
| isocyanate curing agent (trade name: JA-960, manufactured by JUJO CHEMICAL CO., LTD.) | 3 parts |
| triethylene diamine | 0.5 parts |
| solvent (toluene (SP value: 8.9)/methyl isobutyl ketone (SP value: 8.3) = 70/30 [mass ratio]) | 70 parts |

TABLE 1

| Infrared absorbing agent | Solubility [mg/ml] Solvent: toluene | Remarks |
|---|---|---|
| Compound 1 | <0.01 | The invention |
| Compound 2 | 0.05 | The invention |
| Compound 5 | 0.07 | The invention |
| Compound 23 | 1.75 | The invention |
| Compound 24 | 16 | The invention |
| Compound 25 | 27 | The invention |
| Compound 27 | 25 | The invention |
| Compound 69 | 12 | The invention |
| Compound 71 | 16 | The invention |
| Infrared absorbing agent A for comparison | 32 | Comparative |
| Infrared absorbing agent B for comparison | 43 | Comparative |

Infrared absorbing agent A for comparison:
N,N,N',N'-tetrakis(p-di-n-butylaminophenyl)-p-phenylene diaminium perchlorate salt Infrared absorbing agent B for comparison: as shown below

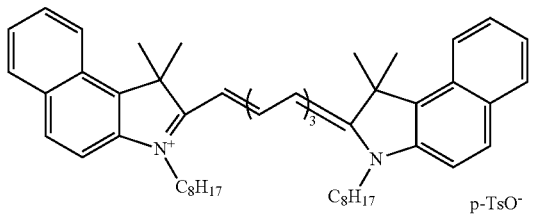

Infrared absorbing agent B for comparison
—Solubility Measurement—

The solubility shown in Table 1 was measured according to the method described below. Specifics are as follows.

First, the THF solution prepared by adding the IR coloring material to tetrahydrofuran (THF) was measured by a spectrophotometer, and the calibration curve was established. Next, a liquid was prepared by adding the IR coloring material to toluene to the level that there is a part of coloring material left undissolved. The resulting liquid was subjected to ultrasonication for 10 minutes while being kept at 25° C., and allowed to stand overnight at 25° C. The THF solution obtained after the standing was filtered using a 0.2 μm filter. The filtrate was diluted so that it falls within the linear range of the calibration curve, and the absorbance was measured. Based on the measured value, the solubility was quantified using the calibration curve. The solubility is shown in Table 1.

—Image Recording—

By using each of the infrared absorbing printing ink obtained above, a bar code pattern was formed on a regular paper (trade name: MP-120, manufactured by PLUS Corporation), i.e., a base paper, by Gravure printing.

Subsequently, on the formed bar code pattern, another bar code pattern was additionally formed by using the infrared absorbing ink (2) having the composition shown below.

| <Composition of infrared absorbing printing ink (2)> | |
|---|---|
| infrared absorbing coloring material shown in Table 1 (IR coloring material) | 5 parts |
| vinyl acetate resin (trade name: S-LEC A, manufactured by SEKISUI CHEMICAL CO., LTD.) | 15 parts |
| saturated polyester (trade name: VYLON 103, manufactured by TOYOBO CO., LTD.) | 5 parts |
| polyurethane elastomer (trade name: N-2304, manufactured by Nippon Polyurethane Industry Co., Ltd.) | 12 parts |
| isocyanate curing agent (trade name: JA-960, manufactured by JUJO CHEMICAL CO., LTD.) | 3 parts |
| triethylene diamine | 0.5 parts |
| solvent (toluene (SP value: 8.9)/methyl isobutyl ketone (SP value: 8.3) = 70/30 [mass ratio]) | 70 parts |

Next, on top of the bar code patterns formed by disposing two layers, three kinds of process inks having infrared transmittance (FDOL Yellow, FDOL Magenta, and FDOL Cyan, manufactured by TOYO INK MFG. CO., LTD. (trade names, manufactured by TOYO INK MFG. CO., LTD.) were further applied by Gravure printing to form a colored layer made of three visible colors (cyan, magenta, and yellow). As a result, a printed article having a bar code pattern disposed inside the matter was produced.

Although the entire surface of the colored layer of the visible colors (cyan, magenta, and yellow) in the obtained printed article is in a visible state, the bar code pattern is hardly visible. Thus, the presence of the bar code pattern itself cannot be recognized with the naked eye.

Two kinds of semiconductor laser beam having wavelengths of 830 nm and 905 nm respectively were irradiated onto the thus obtained printed article, and the detection was made by using a filter which cuts off the emission light having wavelength of 950 nm or less. As a result, it was possible to detect the pattern formed by the infrared absorbing ink.

Subsequently, xenon light of 70,000 lux was irradiated continuously for 200 hours onto the printed article by using a xenon lamp. After that, the reading state of the bar code pattern after the irradiation was evaluated. For the evaluation, PCS (print•contrast•signal) of 0.6 or more was evaluated as "good," and PCS (print•contrast•signal) of less than 0.6 was evaluated as "bad." The evaluation results are shown in Table 2 below.

TABLE 2

| Infrared absorbing agent | Reading before irradiation | Reading after irradiation | Remarks |
|---|---|---|---|
| Compound 1 | Good | Good | The invention |
| Compound 2 | Good | Good | The invention |
| Compound 5 | Good | Good | The invention |
| Compound 23 | Good | Good | The invention |
| Compound 24 | Good | Good | The invention |
| Compound 25 | Good | Good | The invention |
| Compound 27 | Good | Good | The invention |
| Compound 69 | Good | Good | The invention |
| Compound 71 | Good | Good | The invention |
| Infrared absorbing agent A for comparison | Good | Bad | Comparative |
| Infrared absorbing agent B for comparison | Good | Bad | Comparative |

Infrared absorbing agent A for comparison:
N,N,N',N'-tetrakis(p-di-n-butylaminophenyl)-p-phenylene diaminium perchlorate salt Infrared absorbing agent B for comparison: as shown below

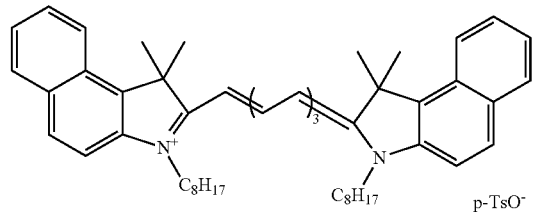

Infrared absorbing agent B for comparison

As shown in Table 2 above, it is evident that the bar code pattern in the printed article of the invention has high light resistance.

The printed article was prepared in the same manner as Example 1 except that the solvent (a mixture solvent of toluene and methyl isobutyl ketone) in the composition of the infrared absorbing ink (1) and (2) is replaced with n-octane (SP value: 7.6), butyl acetate (SP value: 8.5), or isopropyl alcohol (IPA; SP values: 11.5), and evaluated. The evaluation results are shown in Table 3 below.

TABLE 3

| | Solvent | | | | | | |
|---|---|---|---|---|---|---|---|
| | n-octane | | Butyl acetate | | IPA | | |
| | Reading before irradiation | Reading after irradiation | Reading before irradiation | Reading after irradiation | Reading before irradiation | Reading after irradiation | Remarks |
| Compound 1 | Good | Good | Good | Good | Good | Good | The invention |
| Compound 2 | Good | Good | Good | Good | Good | Good | The invention |
| Compound 5 | Good | Good | Good | Good | Good | Good | The invention |
| Compound 23 | Good | Good | Good | Good | Good | Good | The invention |
| Compound 24 | Good | Good | Good | Good | Good | Good | The invention |
| Compound 25 | Good | Good | Good | Good | Good | Good | The invention |
| Compound 27 | Good | Good | Good | Good | Good | Good | The invention |
| Compound 69 | Good | Good | Good | Good | Good | Good | The invention |
| Compound 71 | Good | Good | Good | Good | Good | Good | The invention |

As shown in Table 3 above, it is evident that the bar code pattern in the printed article of the invention has high light resistance.

Examples 2 and 3

The comparative printed article was prepared in the same manner as Example 1 except that the solvent (a mixture solvent of toluene and methyl isobutyl ketone) in the composition of the infrared absorbing ink (1) and (2) is replaced with n-pentane (SP value: 7.0; Example 2) or ethanol (SP value: 12.7; Example 3), and evaluated. The evaluation results are shown in Table 4 below.

TABLE 4

| | Example 2 n-pentane (SP value: 7.0) | | Example 3 Ethanol (SP value: 12.7) | | |
|---|---|---|---|---|---|
| Infrared absorbing agent | Reading before irradiation | Reading after irradiation | Reading before irradiation | Reading after irradiation | Remarks |
| Compound 1 | Good | Bad | Good | Bad | Comparative |
| Compound 2 | Good | Bad | Good | Bad | Comparative |
| Compound 5 | Good | Bad | Good | Bad | Comparative |
| Compound 23 | Good | Bad | Good | Bad | Comparative |
| Compound 24 | Good | Bad | Good | Bad | Comparative |
| Compound 25 | Good | Bad | Good | Bad | Comparative |
| Compound 27 | Good | Bad | Good | Bad | Comparative |
| Compound 69 | Good | Bad | Good | Bad | Comparative |
| Compound 71 | Good | Bad | Good | Bad | Comparative |

As shown in Table 4 above, when the SP value of the solvent is either too low (Example 2) or too high (Example 3), it was impossible to obtain good light resistance.

Example 4

By mixing the components of the composition shown below, an ultraviolet curable ink having an infrared absorbing property was prepared.

| <Composition of ultraviolet curable ink> | |
|---|---|
| PHOTOMER 5018 (trade name, aliphatic polyester tetraacrylate; manufactured by SAN NOPCO LTD.) | 60 parts |
| KAYARAD TMPTA (SP value: 10.5) (trade name, trimethylol propane triacrylate; manufactured by Nippon Kayaku Co., Ltd.) | 14 parts |
| KAYACURE-MBP (SP value: 1.7) (trade name, 3, 3'-dimethyl-4-methoxybenzophenone; manufactured by Nippon Kayaku Co., Ltd.) | 1 part |
| NISSOCURE TX (trade name, thioxanthone; manufactured by Nippon Soda Co., Ltd.) | 8 parts |
| SANDORAY 1000 (trade name, 4-phenoxydichloro acetophenone: manufactured by Sandoz) | 1 part |
| white petrolatum | 4 parts |
| infrared absorbing coloring material shown in Table 1 (IR coloring material) | 12 parts |

By using the ultraviolet curable ink thus obtained, a mark for copy protection was printed on the same base paper as that used in Example 1 by Gravure printing. On top of the printed mark for copy protection, each of the three kinds of a process ink (FDOL Yellow, FDOL Magenta, and FDOL Cyan, trade names, manufactured by TOYO INK MFG. CO., LTD.) was applied as a layer by Gravure printing, or a mixture ink in which the three kinds of a process ink are mixed was applied as a layer by Gravure printing to hide the mark for copy protection, thus obtaining a printed article.

The mark for copy protection that is hidden by the process ink was irradiated with infrared light using a linear sensor (trade name: TCD1500C, manufactured by Toshiba) in which the infrared cut-off filter of linear sensor was replaced with an infrared transmitting filter (trade name: IR83, manufactured by Hoya) as a detection device, and the reflected light was detected simultaneously.

The mark for copy protection was not recognized by visual observation due to the presence of the layer colored with the process ink. However, by using the detection device, only the mark for copy protection was able to be detected in the infrared range without detecting the printed layer made of three kinds of process inks. In other words, since the three kinds of process inks have no absorption in the infrared range, it was possible to detect only the infrared-absorbing mark for copy protection present under the process inks.

The reflection light intensity in the area of the mark for copy protection at the time of detecting the mark was divided by the reflection light intensity of the area outside the mark for copy protection. The resulting value of the comparative infrared absorbing agent A was set to 1, and a ratio of the resulting value with respect to the resulting value of the comparative infrared absorbing agent A was calculated for each compound. The results are shown in Table 5 below.

In addition, the obtained printed article was irradiated continuously with xenon light of 70,000 lux for 72 hours by using a Xenon lamp. After the irradiation, similar to above, the reflection light intensity of the area of the mark for copy protection was divided by the reflection light intensity of the area outside the mark for copy protection, and the variation ratio [%] compared to the value before the irradiation was calculated to use it as an index for evaluation of light resistance. The results are shown in Table 5 below.

TABLE 5

| Infrared absorbing agent | Strength of reflected light before irradiation | Variation amount after irradiation [%] | Remarks |
| --- | --- | --- | --- |
| Compound 1 | 0.2 | <1 | The invention |
| Compound 2 | 0.4 | 3 | The invention |
| Compound 5 | 0.3 | 4 | The invention |
| Compound 23 | 0.5 | 4 | The invention |
| Compound 24 | 0.5 | 3 | The invention |
| Compound 25 | 0.2 | 2 | The invention |
| Compound 27 | 0.3 | 4 | The invention |
| Compound 69 | 0.4 | 4 | The invention |
| Compound 71 | 0.3 | 3 | The invention |
| Infrared absorbing agent A for comparison | 1 | 16 | Comparative |
| Infrared absorbing agent B for comparison | 0.9 | 21 | Comparative |

Infrared absorbing agent A for comparison: N,N,N',N'-tetrakis(p-di-n-butylaminophenyl)-p-phenylene diaminium perchlorate salt Infrared absorbing agent B for comparison: as shown below

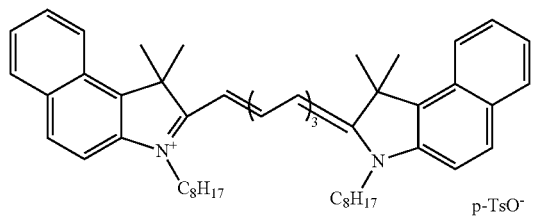

Infrared absorbing agent B for comparison

As shown in Table 5 above, the ultraviolet curable ink of the invention has very high detection sensitivity, and therefore has excellent light resistance.

Example 5

By mixing the components in the composition shown below, an ultraviolet curable ink having an infrared absorbing property was prepared.

| <Composition of ultraviolet curable ink> | |
| --- | --- |
| EPICOAT 828 (trade name, epoxy resin; manufactured by JER) | 25 parts |
| KAYARAD TMPTA (SP value: 10.5) (trade name, trimethylol propane triacrylate; manufactured by Nippon Kayaku Co., Ltd.) | 15 parts |
| KAYARAD DPHA (SP value: 11.1) (trade name, dipentaerythritol hexaacrylate; manufactured by Nippon Kayaku Co.,Ltd.) | 60 parts |
| KAYACURE-DETX (trade name, 2,4'-diethylthioxanthone; manufactured by Nippon Kayaku Co., Ltd.) | 3 parts |
| KAYACURE-DMBI (trade name, p-dimethylamino benzoic acid isoamyl ester; manufactured by Nippon Kayaku Co., Ltd.) | 3 parts |
| infrared absorbing coloring material shown in Table 1 (IR coloring material) | 12 parts |

The detection was performed in the same manner as in Example 4. As a result, the mark for copy protection was not recognized by visual observation due to the presence of the layer colored with the process inks. However, by using the detection device, only the mark for copy protection was able to be detected in the infrared range without detecting the printed layer consisting of three kinds of process inks. The ultraviolet curable ink of the invention has high detection sensibility.

In addition, by using a xenon lamp, xenon light irradiation was performed in the same manner as in Example 4 to evaluate the light resistance. Consequently, the results as shown in Table 5 were obtained, indicating that the ultraviolet curable ink of the invention has high light resistance.

Example 6

By mixing the components in the composition shown below, an ultraviolet curable ink having an infrared absorbing property was prepared.

| <Composition of ultraviolet curable ink> | |
| --- | --- |
| PHOTOMER 5018 (trade name, aliphatic polyester tetraacrylate, manufactured by SAN NOPCO LTD.) | 62 parts |
| KAYARAD TMPTA (SP value: 10.5) (trade name, trimethylol propane triacrylate, manufactured by Nippon Kayaku Co., Ltd.) | 15 parts |
| KAYACURE-MBP (trade name, 3,3'-dimethyl-4-methoxybenzophenone, manufactured by Nippon Kayaku Co., Ltd.) | 61 parts |
| NISSOCURE TX (trade name, thioxanthone, manufactured by Nippon Soda Co., Ltd.) | 4 parts |
| SANDORAY 1000 (trade name, 4-phenoxydichloro acetophenone, manufactured by Sandoz) | 4 parts |
| white petrolatum | 5 parts |
| infrared absorbing coloring material shown in Table 1 (IR coloring material) | 5 parts |

The detection was performed in the same manner as in Example 4. As a result, the mark for copy protection was not recognized by the visual observation due to the presence of the layer colored with the process ink. However, by using the detection device, only the mark for copy protection was able to be detected in the infrared range without detecting the printed layer consisting of three kinds of process inks. The ultraviolet curable ink of the invention has high detection sensibility.

In addition, by using a xenon lamp, xenon light irradiation was performed in the same manner as in Example 4 to evaluate the light resistance. Consequently, the results as shown in Table 5 were obtained, indicating the ultraviolet curable ink of the invention has high light resistance.

According to the invention, an infrared absorbing composition, which has better light resistance compared to a composition having a soluble infrared absorbing agent as a main component, may be provided. In addition, according to the invention, an infrared absorbing ink, a printed article, an image recording method, and an image detecting method, which allow stable reading of image information for a long period of time, may be provided.

The invention may be applied to a security-related field such as letter or image validation and a field of exchanging information by assigning a mark such as a symbol, a dot, or a bar code, and it may be used for copy protection, providing hidden information and the like.

Exemplary embodiments of the invention include, but are not limited to, the following.

<1> An infrared absorbing composition comprising:
a compound that is represented by the following formula (1) and has solubility of 30 mg/mL or less in toluene at 25° C.;
an organic solvent having a solubility parameter in the range of from 7.3 to 12.1; and
a resin;

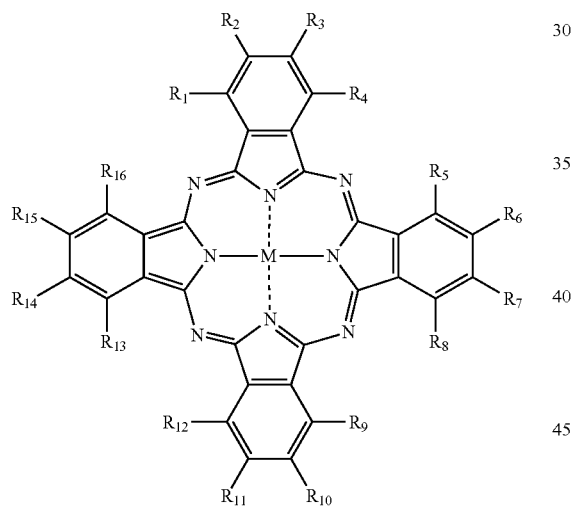

Formula (1)

wherein in formula (1), each of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ independently represents a hydrogen atom or a substituent group, provided that at least one of $R_1$ to $R_{16}$ represents an $R_{17}$—X— group or that the compound represented by formula (1) contains at least one condensed-ring structure in which any adjacent two of $R_1$ to $R_{16}$ form a ring; X represents —S—, —NH—, —NR$_{18}$—, or —O—; each of $R_{17}$ and $R_{18}$ independently represents an aliphatic group or an aryl group; and M represents two atoms selected from the group consisting of hydrogen atoms and monovalent metal atoms, or a divalent metal atom, or a divalent substituted metal atom moiety including a trivalent or tetravalent metal atom and a substituent group.

<2> The infrared absorbing composition of <1>, wherein the compound that is represented by formula (1) and has solubility of 30 mg/mL or less in toluene at 25° C. is at least one selected from the group consisting of the compounds represented by the following formula (1a) and the compounds represented by the following formula (1b):

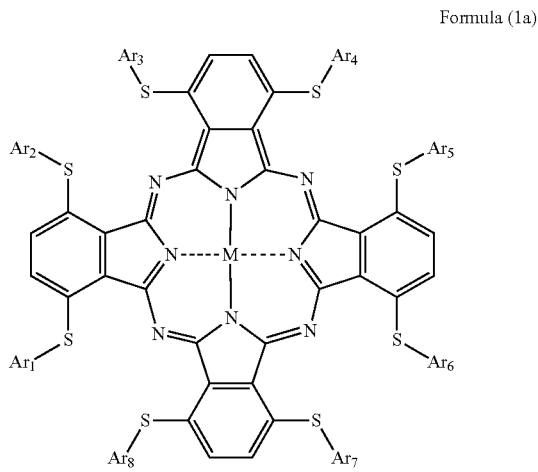

Formula (1a)

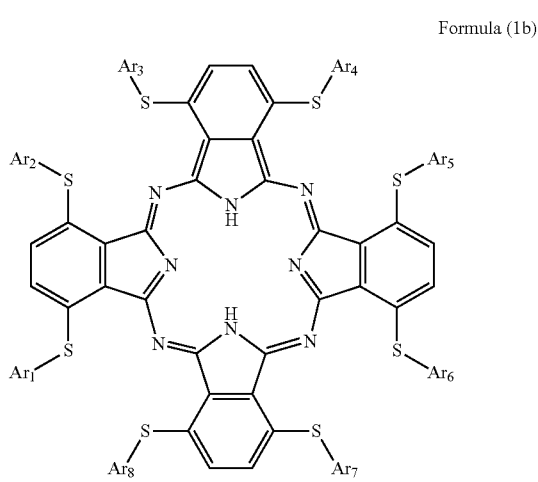

Formula (1b)

wherein M represents two atoms selected from the group consisting of hydrogen atoms and monovalent metal atoms, or a divalent metal atom, or a divalent substituted metal atom moiety including a trivalent or tetravalent metal atom and a substituent group; and each of $Ar_1$, $Ar_2$, $Ar_3$, $Ar_4$, $Ar_5$, $Ar_6$, $Ar_7$, and $Ar_8$ independently represents a substituted or unsubstituted aryl group.

<3> The infrared absorbing composition of <1> or <2>, wherein the organic solvent having a solubility parameter in the range of from 7.3 to 12.1 is at least one selected from the group consisting of aromatic hydrocarbons, aliphatic hydrocarbons, ketones, esters, ethers and alcohols.

<4> The infrared absorbing composition of any one of <1> to <3>, wherein the resin is at least one selected from the group consisting of rosin, modified rosins, rosin derivatives, modified rosin derivatives, petroleum resins, dicyclopentadiene resins and modified dicyclopentadiene resins.

<5> The infrared absorbing composition of any one of <1> to <4>, wherein a content of the resin by mass ratio is from 1% by mass to 99% by mass with respect to a total solid content of the composition.

<6> The infrared absorbing composition of any one of <1> to <5>, wherein the organic solvent having a solubility parameter in the range of from 7.3 to 12.1 includes two or more organic solvents each having a solubility parameter in the range of from 7.3 to 12.1.

What is claimed is:

1. An infrared absorbing composition comprising:
a compound that is represented by the following formula (1a) or (1b) and has solubility of 30 mg/mL or less in toluene at 25° C.;
an organic solvent having a solubility parameter in the range of from 7.3 to 12.1 the organic solvent having a solubility parameter in the range of from 7.3 to 12.1 being (a) a combination of at least one aromatic or aliphatic hydrocarbon selected from the group consisting of toluene, ethyl benzene, xylene and benzene and at least one ketone selected from the group consisting of methyl isobutyl ketone, methyl isopropyl ketone, methyl ethyl ketone and methyl propyl ketone, or (b) comprising a polymerizable compound having a solubility parameter in the range of from 7.3 to 12.1; and
a resin;

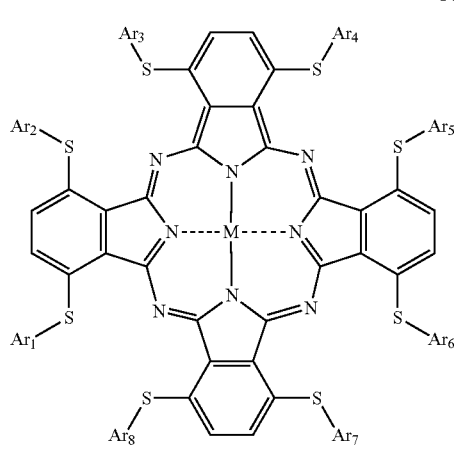

Formula (1a)

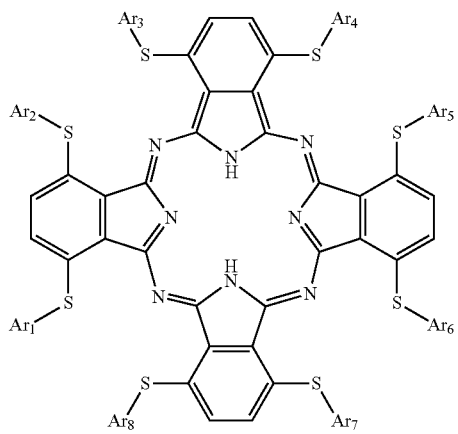

Formula (1b)

wherein M represents (i) two hydrogen atoms, (ii) a divalent metal atom, (iii) a divalent metal oxide, (iv) a divalent metal hydroxide, or (v) a divalent metal chloride; and each of $Ar_1$, $Ar_2$, $Ar_3$, $Ar_4$, $Ar_5$, $Ar_6$, $Ar_7$ and $Ar_8$ independently represents a substituted or unsubstituted aryl group.

2. The infrared absorbing composition of claim 1, wherein the resin is at least one selected from the group consisting of rosin, modified rosins, rosin derivatives, modified rosin derivatives, petroleum resins, dicyclopentadiene resins and modified dicyclopentadiene resins.

3. The infrared absorbing composition of claim 1, wherein the content of the resin by mass ratio is from 1% by mass to 99% by mass with respect to the total solids content of the composition.

4. The infrared absorbing composition of claim 1, wherein the organic solvent having a solubility parameter in the range of from 7.3 to 12.1 includes two or more organic solvents each having a solubility parameter in the range of from 7.3 to 12.1.

5. An infrared absorbing ink comprising the infrared absorbing composition of claim 1.

6. A recorded article comprising a recording medium and an image formed thereon using the infrared absorbing ink of claim 5.

7. An image recording method comprising recording an image by applying on a recording medium the infrared absorbing ink of claim 5.

8. An image detection method comprising detecting, by an infrared ray detection device, image information of the image formed by the image recording method of claim 7 on the recording medium.

9. The infrared absorbing composition of claim 1, wherein the combination of at least one aromatic or aliphatic hydrocarbon selected from the group consisting of toluene, ethyl benzene, xylene and benzene and at least one ketone selected from the group consisting of methyl isobutyl ketone, methyl isopropyl ketone, methyl ethyl ketone and methyl propyl ketone is a combination of toluene and methyl isobutyl ketone.

10. The infrared absorbing composition of claim 1, wherein the polymerizable compound having a solubility parameter in the range of from 7.3 to 12.1 is a (meth)acrylic monomer having a solubility parameter in the range of from 7.3 to 12.1.

11. The infrared absorbing composition of claim 1, wherein the organic solvent having a solubility parameter in the range of from 7.3 to 12.1 comprises a polymerizable compound having a solubility parameter in the range of from 7.3 to 12.1.

* * * * *